(12) United States Patent
Shau

(10) Patent No.: US 9,401,645 B1
(45) Date of Patent: Jul. 26, 2016

(54) ELECTRICAL VOLTAGE CONVERTER CIRCUITS

(71) Applicant: Jeng-Jye Shau, Palo Alto, CA (US)

(72) Inventor: Jeng-Jye Shau, Palo Alto, CA (US)

(*) Notice: Subject to any disclaimer, the term of this patent is extended or adjusted under 35 U.S.C. 154(b) by 0 days.

(21) Appl. No.: 14/672,200

(22) Filed: Mar. 29, 2015

(51) Int. Cl.
*H02M 3/158* (2006.01)

(52) U.S. Cl.
CPC ..................... *H02M 3/158* (2013.01)

(58) Field of Classification Search
CPC . H02M 3/158; H02M 3/1582; H02M 3/1588; H02M 3/156
USPC ........................... 323/224, 225, 271, 282, 351
See application file for complete search history.

(56) References Cited

U.S. PATENT DOCUMENTS

| | | | | | |
|---|---|---|---|---|---|
| 4,384,321 | A | * | 5/1983 | Rippel | H02M 1/4225 320/DIG. 31 |
| 5,006,782 | A | * | 4/1991 | Pelly | H02M 3/158 323/225 |
| 2003/0155898 | A1 | * | 8/2003 | Olsen | H02M 3/1584 323/283 |
| 2004/0046535 | A1 | * | 3/2004 | Duffy | H02M 3/1584 323/283 |
| 2010/0259951 | A1 | * | 10/2010 | Adragna | H02M 3/337 363/17 |
| 2011/0012687 | A1 | * | 1/2011 | Effler | H02M 3/157 332/110 |
| 2014/0253065 | A1 | * | 9/2014 | Brown | H02M 3/158 323/272 |

* cited by examiner

*Primary Examiner* — Adolf Berhane

(57) ABSTRACT

The preferred embodiments of the present invention change the switching circuits in switched-mode voltage converter circuits. Instead of switching at full amplitude of input voltage, the preferred embodiments of the present invention provide partial voltage switching signals to the electrical filters. The resulting voltage converter circuits operates at better power efficiency while achieving significantly better space and cost efficiency.

20 Claims, 10 Drawing Sheets

ELECTRICAL VOLTAGE CONVERTER CIRCUITS

BACKGROUND OF THE INVENTION

The present invention relates to electrical voltage converter circuits, and more particularly to high efficiency voltage converter circuits that comprise partial voltage switching circuits.

Electrical components are typically optimized to operate at a pre-determined voltage such as 19 volts, 12 volts, 5 volts, 3.3 volts, and 1.2 volts. A wide varieties of electrical components are optimized to operate at a wide varieties of voltages, so that it is often necessary to use electrical voltage converter circuits to convert a voltage source at one voltage to a voltage source at a different voltage. An electrical voltage converter circuit, by definition, is an electrical circuit that draw electrical power from one voltage source while outputting electrical power at a different voltage. The input voltage source can be a direct current (DC) voltage source, an alternative current (AC) voltage source, a DC voltage source with ripples, or any type of voltage sources. The output voltage is typically DC, but it also can be other types of waveforms. When the input voltage source is coupled to the main power source, the electrical voltage converter is called an electrical power converter.

Currently, most of commercial electrical voltage converter circuits are switched-mode voltage converters. FIG. 1(a) shows a simplified symbolic diagram for a prior art switched-mode voltage converter called Buck converter. In this example, the power of this circuit is provided by a voltage source (100) with one terminal at voltage Vi while the other terminal at voltage Vsi, as shown in FIG. 1(a). The Vi terminal is coupled to the drain terminal of a metal-oxide-semiconductor (MOS) transistor (101). The gate voltage of the transistor (101) is Vg, and the source voltage of the transistor (101) is Vp, as shown in FIG. 1(a). The source terminal of the MOS transistor is connected to the cathode of an electrical diode (102); the anode of the electrical diode is connected to the Vsi terminal of the voltage source (100). The source terminal of the MOS transistor (101) is also connected to a terminal of an electromagnetic component (103), which is an inductor in this example. The other terminal of the inductor (103) is connected to one terminal of a capacitor (Co), while the other terminal of Co is connected to output ground at voltage Vs. Vsi and Vi can be the same voltage, and they also can be isolated from each other. In this example, the electromagnetic component (103) and the capacitor (Co) forms an electrical filter (105) that provides an output voltage (Vo) that is the average voltage of Vp. This output voltage (Vo) can be used as a voltage source providing electrical power to other circuits (Ld). A duty cycle control circuit (108) uses a sensing circuit (107) to sense the output voltage (Vo) and control the output voltage value by controlling the duty cycle of the switching signal Vp.

The key to achieve high power efficiency for a switched-mode converter is that the MOS transistor (101) must be either fully on or fully off almost all the time. When the transistor (101) is fully on or fully off, the power consumed by the transistor is very small so that a high percentage of the input power is transferred to the output instead of consumed by the converter circuit. Therefore, the waveform of Vp should switch mostly between Vi and Vsi, such as the example shown in FIG. 1(b). When the source voltage Vp is near Vi or Vsi, the power consumed by the MOS transistor (101) is very small. When Vp is not at Vi or Vsi during transient events, the power consumed by the MOS transistor can be large.

For a Buck converter, at ideal condition, the output voltage (Vo) is related to the waveform of Vp as Vo=D*(Vi−Vsi), where D=(Ton/(Ton+Toff)) is called "duty cycle", Ton is the time when the MOS transistor is turned on in a period, and Toff is the time when the MOS transistor is turned off in a period, as illustrated in FIG. 1(b). The value of the output voltage (Vo) can be controlled by a duty cycle control circuit (108) which detects the level of the output voltage using a sensing circuit (107) as a feedback to determine the value of the duty cycle. FIG. 1(b) also shows the waveform of Vo, which is nearly a constant in this example.

Switch-mode voltage converters are currently the most successful prior art voltage converters. With proper designs, switch-mode converters can achieve better than 90% power efficiency. However, prior art switch mode voltage converters have many problems. One major problem is the voltage stress on the MOS transistor (101). At ideal condition, the voltage stress on the MOS transistor (101) in FIG. 1(a) is the full voltage (Vi-Vsi) of the input voltage source (100). If the input or output voltage is high, prior art switch-mode voltage converters need to use transistors that can tolerate high voltages. Such high voltage transistors are bulky, expensive, and slow. It is therefore highly desirable to reduce the voltage stress applied on switching circuit components. In addition, as illustrated in FIG. 1(b), when Vp is switching from Vs to Vi, there is a voltage overshoot (121) caused by the electromagnetic component (103); similarly, when Vp is witching from Vi to Vs, there is another voltage overshoot (122). These voltage overshoots (121, 122) cause additional stresses on the MOS transistor (101). The overshoot voltage is proportional to the value of the inductor (103), so that one of prior art solution is to use large electromagnetic components to reduce voltage overshoots. However, large electromagnetic components are heavy, bulky, and expensive. It is therefore highly desirable to reduce voltage overshoots without using large electromagnetic components.

FIG. 1(c) illustrates the waveforms of the electrical current (IL) passing through the inductor (103) and the load current (ILd) of the prior art circuit in FIG. 1(a). The inductor current (IL) swings from Ib to Ip when the MOS transistor (101) is turned on, and swings from Ip back to Ib when the MOS transistor is turned off, as shown in FIG. 1(c). The peak current (Ip) can be significantly higher than the load current (IL), which causes power lost due to parasitic resistance of the electromagnetic component. Prior art solution for this problem is to use a large electromagnetic component that has low parasitic resistance, which further increase the size, weight, and cost of the electromagnetic component. It is therefore highly desirable to reduce this current overshoot without increasing the size of the electromagnetic component. The other solution is to increase the frequency of the switching signal (Vp). However, high voltage transistors are slow so that the switching frequency is limited. It is therefore highly desirable to develop voltage converter circuits that can operate at high frequency.

Besides Buck converters, a wide varieties of switch-mode converters have been developed. FIG. 1(d) shows a simplified symbolic diagram for a prior art switched-mode voltage converter circuit called Buck-Boost converter. The structures of this Buck-Boost converter in FIG. 1(d) are similar to those of the Buck convert in FIG. 1(a) except that the connectors to the inductor (143) and the diode (142) is inverted. For a Buck-Boost converter, at ideal condition, the output voltage Vo=D/(D−1)*(Vi−Vs), where D is the duty cycle. A duty cycle control circuit (148) controls the duty cycle of the switching signal outputs by the MOS transistor (141) to control the value of the output voltage. The voltage stress problem and the current overshoot problem of Buck-Boost converters are worse than those of Buck converters. FIG. 1(e) shows a simplified symbolic diagram for a prior art switched-mode voltage converter circuit called Flyback converter. The electromagnetic component used in this voltage converter is a transformer (153), instead of an inductor. The ground terminal (Vsi) of the input voltage source (100) is separated from the output ground (Vs) connection, as shown in FIG. 1(e). The input voltage (Vi) is coupled to one input terminal of the transformer (153) through an electrical switch (151), while the ground terminal (Vsi) of the voltage source (100) is connected to the other input terminal of the transformer (153). One output terminal of the transformer (153) is connected to the ground (Vs) while the other output terminal is connected to the anode of an electrical diode (152). The cathode terminal of the diode (152) connected to the output (Vo). A duty cycle control circuit (158) controls the output of an electrical switch (151) in order to control the value of the output voltage (Vo).

FIG. 1(f) shows a simplified symbolic block diagram illustrating the general structures of prior art switched-mode voltage converter circuits. An input voltage source (100) provides electrical power to a full voltage switching circuit (161) that outputs a switching signal that switches between the input voltage Vi and input ground voltage Vsi. This switching signal is coupled to an electrical filter (163) that comprises at least one electromagnetic component, which is either a transformer or an inductor. The electrical filter (163) provides an output voltage (Vo) to output loading (Ld), and a duty cycle control circuit (168) controls the value of Vo by controlling the duty cycle of the switching signal generated by the full voltage switching circuit (161). The output voltage (Vo) is therefore controlled to be a waveform that is suitable to be used by the load (Ld) circuit. The output ground (Vs) connection can be the same as the input ground (Vsi), and it also can be isolated from the input ground. These and other prior art switch mode converters are discussed in the book "Fundamental of Power Electronics" authored by Erickson as one of many publications that introduced switched-mode converters. However, all of the prior art switch-mode converters suffers similar voltage stress, voltage overshoot, and current overshoot problems as illustrated in FIG. 1(b, c). It is therefore highly desirable to provide solutions to those problems for switch-mode voltage converter circuits of different configurations.

SUMMARY OF THE PREFERRED EMBODIMENTS

A primary objective of the preferred embodiments of the present invention is to improve the power efficiency of electrical voltage converter circuits. One objective of the preferred embodiment is to reduce the voltage stress on switching circuits used by switched-mode voltage converters. An objective of the preferred embodiment is to reduce the current overshoots in electromagnetic components used by voltage converter circuits. Another objective of the preferred embodiment is to increase the switching frequencies of the switches used by voltage converter circuits. Another primary objective of the preferred embodiments is to use low voltage MOS transistors to support the switching circuits used in electrical voltage converter circuits. These and other objectives are assisted by using partial voltage switching circuits instead of full voltage switching circuits.

While the novel features of the invention are set forth with particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 2A:
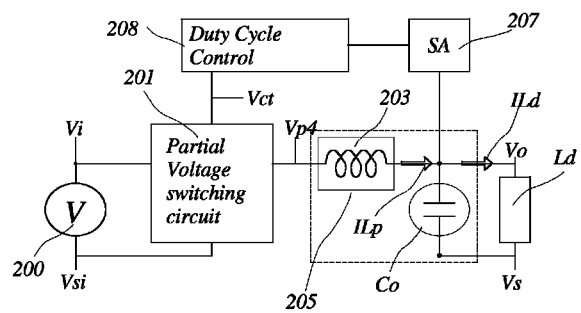
FIG. 2(a) is a simplified symbolic diagram illustrating the structures of an exemplary embodiment of a voltage converter circuit of the present invention.

FIG. 2(a) shows a simplified symbolic diagram for an exemplary embodiment of a voltage converter circuit of the present invention. In this example, the power of this circuit is provided by a voltage source (200) with one terminal at voltage Vi and the other terminal at voltage Vsi, as shown in FIG. 2(a). This voltage source (200) is connected to a partial voltage switching circuit (201) to generate a partial voltage switching signal (Vp4). The partial voltage switching signal (Vp4) is coupled to a terminal of an electromagnetic component (203), which is an inductor in this example. The other terminal of the inductor (203) is connected to one terminal of a capacitor (Co) while the other terminal of the capacitor (Co) is connected to ground (Vs). Vsi and Vs can be the same voltage; they also can be isolated from each other. The electromagnetic component (203) and the capacitor (Co) form an electrical filter (205) that provides an output voltage (Vo) that is equal to the average voltage of the partial voltage switching signal (Vp4). This output voltage (Vo) can be used as a voltage source to support other circuits (Ld). A duty cycle control circuit (208) uses a sensing circuit (207) to sense the output voltage (Vo) and control the output voltage value by controlling the duty cycle of the partial voltage switching signal (Vp4). For some applications there may be no need to use the sensing circuit (207). Depending on the structures of the partial voltage switching circuit (201), the duty cycle control (Vct) provided by the duty cycle control circuit (208) can be one signal or a plurality of signals.

Figure 3A:
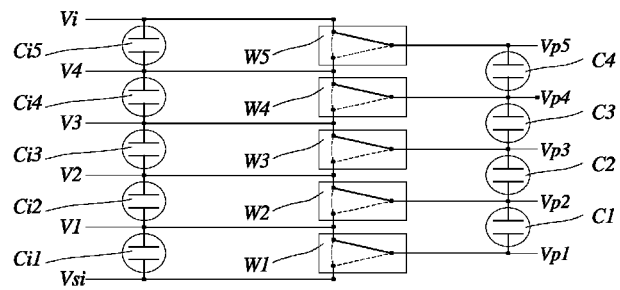
FIG. 3(a, b) are simplified symbolic diagrams illustrating the structures of an exemplary embodiment of the partial voltage switching circuit (201) of the voltage converter circuit in FIG. 2(a)
FIG. 3(c) shows typical waveforms for the switching signals (Vp1-Vp5) generated by the partial voltage switching circuit in FIG. 3(a, b)
Figure 3B:
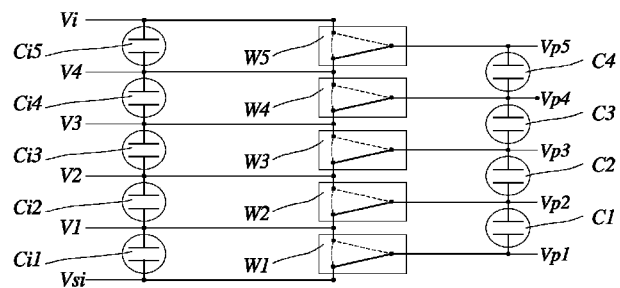
Figure 3C:
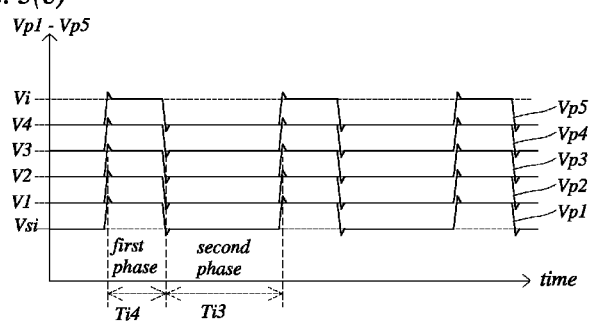

FIG. 3(a, b) are simplified symbolic diagrams illustrating the structures of an exemplary embodiment of the partial voltage switching circuit (201) of the circuit in FIG. 2(a); FIG. 3(a) shows the circuit configuration during the first phase of a switching cycle, and FIG. 3(b) shows the circuit configuration during the second phase of a switching cycle. In this example, the two terminals (Vi, Vsi) of the voltage source (200) in FIG. 2(a) are connected to 5 serial capacitors (Ci1-Ci5), as shown in FIG. 3(a, b), where Vsi is connected to the bottom terminal of Ci1, the top terminal of Ci1 is connected to the bottom terminal of Ci2 at a voltage V1, the top terminal of Ci2 is connected to the bottom terminal of Ci3 at a voltage V2, the top terminal of Ci3 is connected to the bottom terminal of Ci4 at a voltage V3, the top terminal of Ci4 is connected to the bottom terminal of Ci5 at a voltage V4, and the top terminal of Ci5 is connected to the top terminal of the voltage source (200) at voltage Vi. In the example shown in FIG. 3(a, b), 5 electrical switches (W1-W5) are configured to generate 5 partial voltage switching signals (Vp1-Vp5). During the first phase of a switching period, the electrical switches (W1-W5) are configured in such a way that Vp1 is connected to V1, Vp2 is connected V2, Vp3 is connected to V3, Vp4 is connected to V4, and Vp5 is connected to Vi, as shown in FIG. 3(a). Therefore, in the first phase, Vp1 equals V1, Vp2 equals V2, Vp3 equals V3, Vp4 equals V4, and Vp5 equals Vi, as shown by the voltage waveforms in FIG. 3(c). During the second phase of a switching period, the electrical switches (W1-W5) are configured in such a way that Vp1 is connected to Vsi, Vp2 is connected to V1, Vp3 is connected to V2, Vp4 is connected to V3, and Vp5 is connected to V4, as shown in FIG. 3(b). Therefore, in the second phase, Vp1 equals Vsi, Vp2 equals V1, Vp3 equals V2, Vp4 equals V3, and Vp5 equals V4, as shown by the voltage waveforms in FIG. 3(c). Therefore, under control of the duty cycle control circuit (208), partial voltage switching signal Vp1 switches between Vsi and V1, partial voltage switching signal Vp2 switches between V1 and V2, partial voltage switching signal Vp3 switches between V2 and V3, partial voltage switching signal Vp4 switches between V3 and V4, and partial voltage switching signal Vp5 switches between V4 and Vi, as shown by FIG. 3(c). These 5 partial voltage switching signals (Vp1-Vp5) are coupled to one another through 4 coupling capacitors (C1-C4). As shown in FIG. 3(a, b), capacitor C1 couples Vp1 to Vp2, capacitor C2 couples Vp2 to Vp3, capacitor C3 couples Vp3 to Vp4, and capacitor C4 couples Vp4 to Vp5. Due to charge sharing among those coupling capacitors (C1-C4), at steady state, the amplitudes of the partial voltage switching signals (Vp1-Vp5) are about the same. Therefore, in this example, the amplitudes of the partial voltage switching signals (Vp1-Vp5) are about equal to (Vi-Vsi)/5 that are about 5 times smaller than the amplitude of prior art full voltage switching signals.

The waveforms shown in our figures are simplified for clarity. Secondary effects such as the voltage drop caused by none-ideal switches, voltage drops due to none-ideal capacitors, changes in voltage due to leakage current, ringing, noise, and so on are not shown in our figures. In our discussions, when a voltage is described as equal to another voltage, the statement only means they are equal under ideal conditions when secondary effects are not considered. These secondary differences should not be considered as limitations on the scopes of the present invention.

Figure 2B:
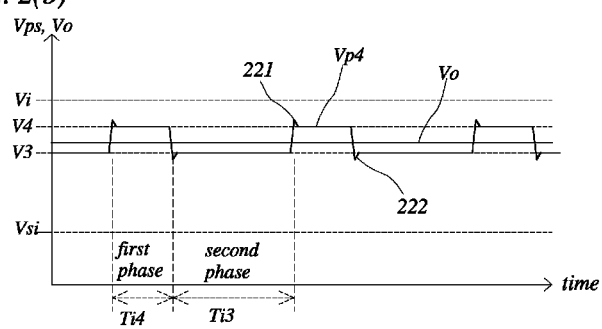
FIG. 2(b) shows typical waveforms for the switching signal (Vp4) and the output voltage of the circuit in FIG. 2(a)

We can couple any one of the partial voltage switching signals (Vp1-Vp5) to the electrical filter. If Vp4 is the partial voltage signal connected to the electrical filter, as shown by the sample in FIG. 2(a), then, at ideal conditions, the output voltage is the average voltage of Vp4 as Vo=Dp*(V4−V3)+V3, where Dp=(Ti4/(Ti4+Ti3)) is the duty cycle, Ti4 is the time interval of the first phase in a switching period, and Ti3 is the time interval of the second phase in a switching period, as illustrated in FIG. 2(b). The value of the output voltage (Vo) can be controlled by a duty cycle control circuit (208) which detects the level of the output voltage using a sensing circuit (207) as feedback to determine the value of the duty cycle (Dp), and generates the switch control (Vct) to control the level of the output voltage (Vo). When partial voltage Vp4 is connected to the electrical filter, the output voltage can be adjusted between V3 and V4 by adjusting the duty cycle (Dp). If the desired output voltage is between V2 and V3, we can use Vp3 instead of Vp4. Other partial voltage signals (Vp1, Vp2, Vp5) also can be used in similar ways. It is also possible to use multiple partial voltage signals to generate multiple output voltages simultaneously.

Figure 1A:
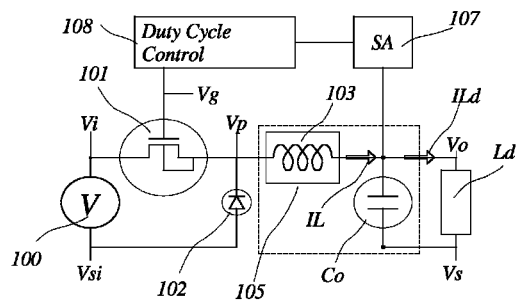
FIG. 1(a) is a simplified symbolic diagram illustrating the structures of a prior art Buck converter.
Figure 1B:
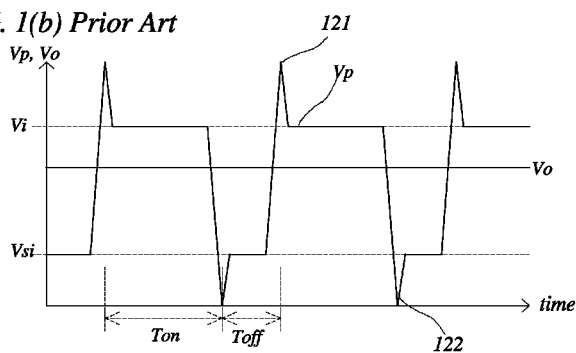
FIG. 1(b) shows typical waveforms for the switching signal and the output voltage of the prior art Buck converter in FIG. 1(a)
Figure 1C:
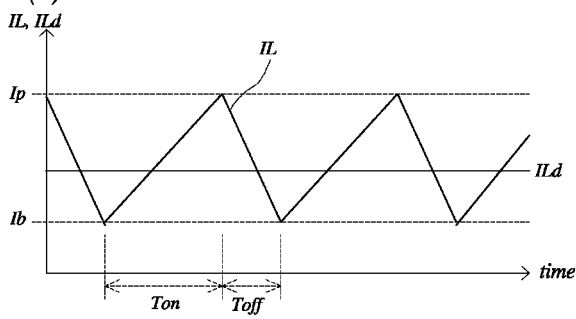
FIG. 1(c) shows typical waveforms for the inductor current (IL) and the load current (ILd) of the prior art Buck converter in FIG. 1(a)
Figure 1D:
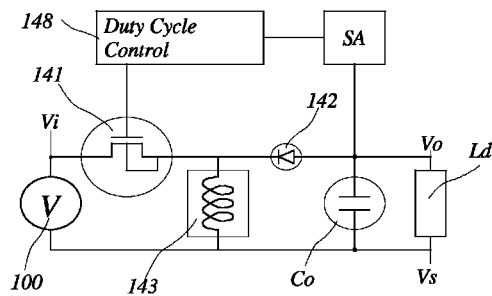
FIG. 1(d) is a simplified symbolic diagram illustrating the structures of a prior art Buck-Boost converter.
Figure 1E:
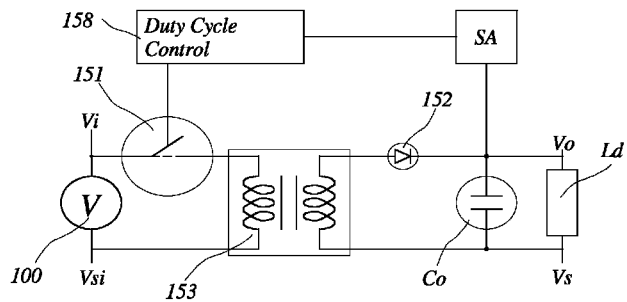
FIG. 1(e) is a simplified symbolic diagram illustrating the structures of a prior art Flyback converter that uses a transformer (153) instead of an inductor.
Figure 1F:
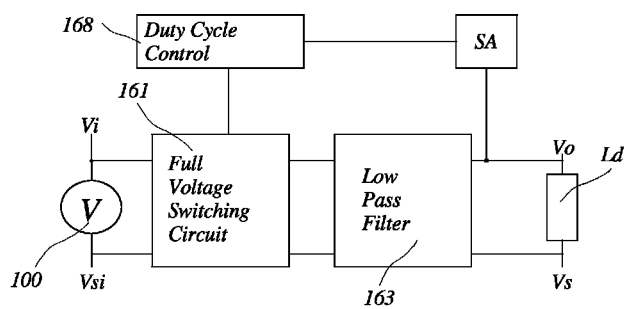
FIG. 1(f) is a symbolic block diagram illustrating the structures of a prior art switched-mode voltage converter circuit.
Figure 2C:
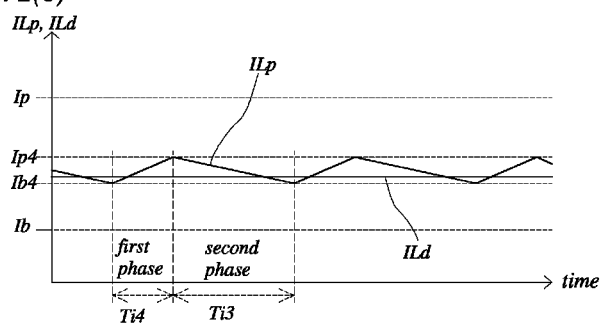
FIG. 2(c) shows typical waveforms for the inductor current (ILp) and the output current (ILd) of the circuit in FIG. 2(a)

FIG. 2(c) illustrates the waveforms of the electrical current (ILp) and the load current (ILd) of the circuit in FIG. 2(a). The inductor current (ILp) swings from Ib4 to Ip4 during the first phase, and swings from Ip4 back to Ib4 during the second phase, as shown in FIG. 2(c). Because of small voltage drops on the electromagnetic component (203), the peak current (Ip4) is much smaller than that (Ip) of the prior art circuit shown in FIG. 1(c).

Using the partial voltage switching signal (Vp1-Vp5) instead of a full voltage switching signal to generate the output voltage (Vo) has many advantages. For the above example, the amplitude of the partial voltage switching signal (Vp4) is about ⅕ of the prior art full voltage switching signal in FIG. 1(b). The voltage overshoots (221, 222) are also about ⅕ that of the prior art circuits, as illustrated in FIG. 2(b). Therefore, the voltage stresses on the switching circuits are about ⅕ of prior art voltage converters. That means we can use low voltage electrical components in the switching circuits. Low voltage electrical components are typically faster, more efficient, and more cost effective than high voltage components. Using a partial voltage switching signal, the voltage drop on the inductor (203) is always much smaller than that of the prior art circuits. Therefore, the current overshoots of the inductor current is by far smaller than that of prior art circuits, as illustrated by FIG. 2(c). The power lost due to inductor parasitic resistance is therefore much smaller. Using partial voltage switching circuits provides the flexibility to use smaller electromagnetic component to reduce the size, weight, and cost of the circuit. Due to low voltage stress and low current overshoots, partial voltage switching circuits typically can operate at frequencies much higher than that of prior art full voltage switching circuits. Prior art switch-mode voltage converter circuits typically operate at frequencies around 100 thousand cycles per second, while partial voltage switching circuits can operate at 1 million cycles per second, 10 million cycles per second, 100 million cycles per second, or higher frequencies. Operating at higher frequency provides the flexibility to further reduce the size of the electromagnetic components (203).

While the preferred embodiments have been illustrated and described herein, other modifications and changes will be evident to those skilled in the art. It is to be understood that there are many other possible modifications and implementations so that the scope of the invention is not limited by the specific embodiments discussed herein. For examples, the electromagnetic component (203) in FIG. 2(a) is an inductor while transformer based electrical filter also can be used with partial voltage switching circuits; the electrical filter (205) in FIG. 2(a) is similar to that in a Buck converter, while we can use electrical filters similar to those used in Buck-Boost converter, Flyback converter, or other types of converters. The partial voltage switching circuit in FIG. 3(a, b) generates 5 partial voltage signals (Vp1-Vp5) while a partial voltage switching circuit of the present invention can generate more or less partial voltage switching signals. For the example shown in FIG. 3(c), the amplitudes of the partial voltage switching signals are about equal to one another, while the amplitudes of partial voltage switching signals do not need to be about equal to one another. For the example shown in FIG. 3(a-c), the value of the output voltage is always between the two terminal voltages (Vi, Vsi) of the voltage source (200), while we can use partial voltage switching circuits to generate output voltages out of the input voltage range, as shown by the example in FIG. 4(a-c).

Figure 4A:
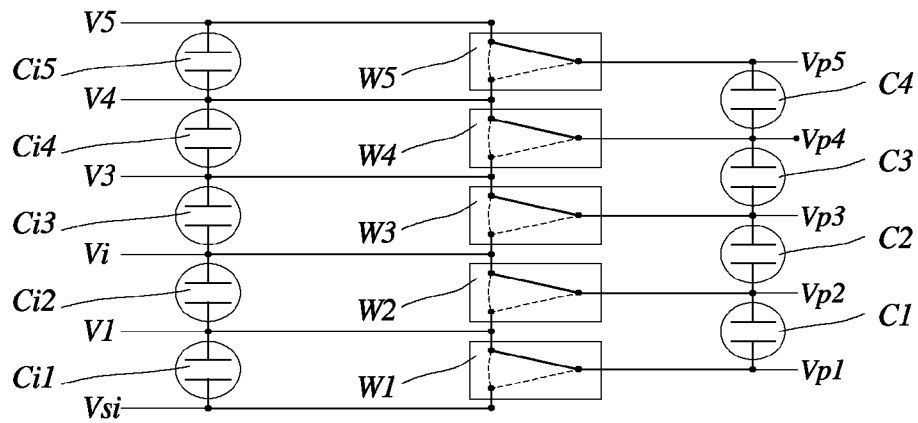
FIG. 4(a, b) are simplified symbolic diagrams illustrating the same partial voltage switching circuit illustrated in FIG. 3(a, b) while the input voltage (Vi) is connected at a different position.
FIG. 4(c) shows typical waveforms for the switching signals (Vp1-Vp5) generated by the partial voltage switching circuit in FIG. 4(a, b)
Figure 4B:
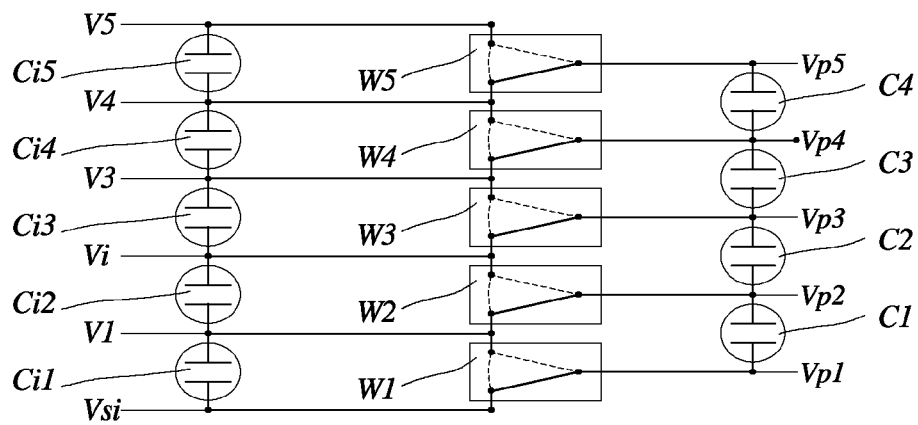
Figure 4C:
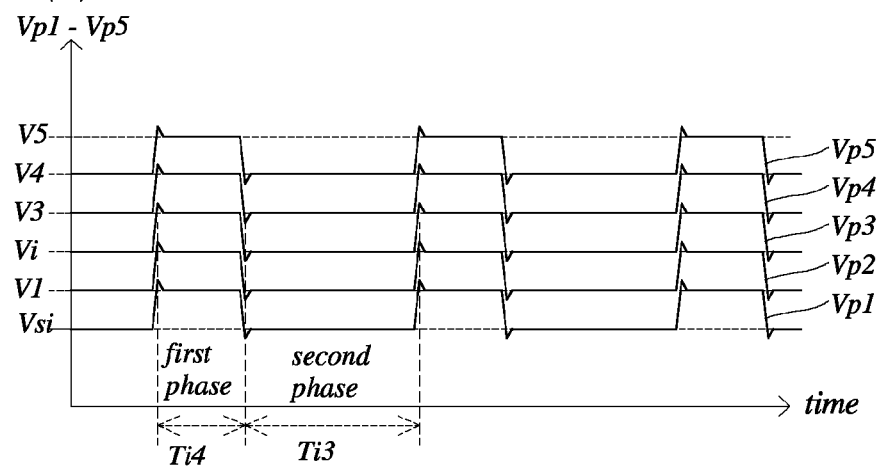

The structures of the partial voltage switching circuit shown in FIG. 4(a, b) are identical to those shown in FIG. 3(a, b) except that the input terminal voltage Vi is connected to the top terminal of Ci2 instead of that of Ci5, and the top terminal of Ci5 is at a voltage V5, as shown in FIG. 4(a, b). During the first phase of a switching period, the electrical switches (W1-W5) are configured in such way that Vp1 is connected to V1, Vp2 is connected Vi, Vp3 is connected to V3, Vp4 is connected to V4, and Vp5 is connected to V5, as shown in FIG. 4(a). Therefore, in the first phase, Vp1 equals V1, Vp2 equals Vi, Vp3 equals V3, Vp4 equals V4, and Vp5 equals V5, as shown by the voltage waveforms in FIG. 4(c). During the second phase of a switching period, the electrical switches (W1-W5) are configured in such way that Vp1 is connected to Vsi, Vp2 is connected to V1, Vp3 is connected to Vi, Vp4 is connected to V3, and Vp5 is connected to V4, as shown in FIG. 4(b). Therefore, in the second phase, Vp1 equals Vsi, Vp2 equals V1, Vp3 equals Vi, Vp4 equals V3, and Vp5 equals V4, as shown by the voltage waveforms in FIG. 4(c). Therefore, partial voltage switching signal Vp1 switches between Vsi and V1, partial voltage switching signal Vp2 switches between V1 and Vi, partial voltage switching signal Vp3 switches between Vi and V3, partial voltage switching signal Vp4 switches between V3 and V4, and partial voltage switching signal Vp5 switches between V4 and V5, as shown by FIG. 4(c). Due to charge sharing among those coupling capacitors (C1-C4), at steady state, the amplitudes of the partial voltage switching signals (Vp1-Vp5) are about the same. Therefore, in this example, the amplitudes of the partial voltage switching signals (Vp1-Vp5) are about equal to (Vi-Vsi)/2, as shown in FIG. 4(c).

If Vp4 is still connected to the electrical filter, as shown by the sample in FIG. 2(a), then the output voltage is the average voltage of Vp4 as Vo=Dp*(V4−V3)+V3, where Dp=(Ti4/(Ti4+Ti3)) is the duty cycle, Ti4 is the time interval of the first phase in a switching period, and Ti3 is the time interval of the second phase in a switching period. The difference is that V3 in FIG. 4(c) is about equal to 1.5 times Vi, while V4 in FIG. 4(c) is about equal to 2 times Vi, and the output voltage Vo is between 1.5 and 2.0 times Vi. Therefore, by connecting the input voltage source differently, we can generate output voltage at levels beyond the voltage level of input voltage source, as illustrated by the example shown in FIG. 4(a-c).

Figure 5A:
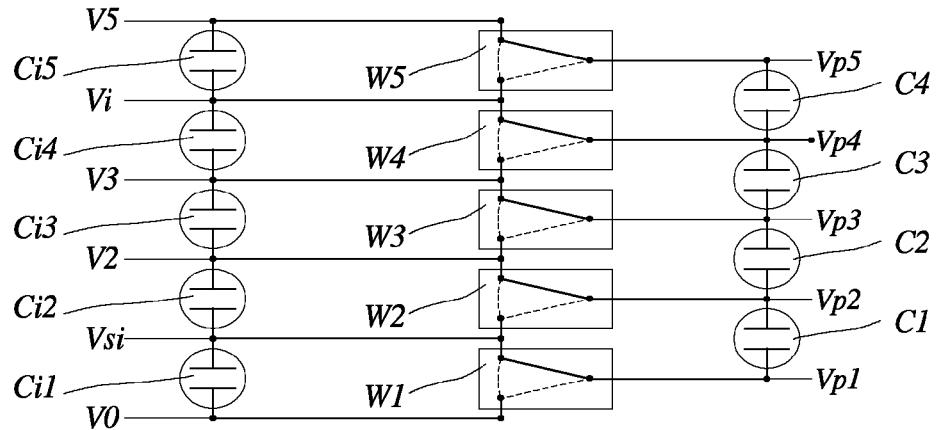
FIG. 5(a-f) are simplified symbolic diagrams for exemplary embodiments of partial voltage switching circuits that can be used by the voltage converter circuit in FIG. 2(a)

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, we also can connect the ground terminal (Vsi) of the input voltage source (200) differently as shown by the example in FIG. 5(a). The structures of the partial voltage switching circuit shown in FIG. 5(a) are identical to those shown in FIG. 3(a, b) except that the input terminal Vi is connected to the top terminal of Ci4, the input terminal Vsi is connected to the top terminal of Ci1, the top terminal of Ci5 is at voltage V5, and the bottom terminal of Ci1 is at voltage VO. Due to charge sharing among coupling capacitors (C1-C4), at steady state, the amplitudes of the partial voltage switching signals (Vp1-Vp5) are about the same, and the amplitudes of the partial voltage switching signals (Vp1-Vp5) are about equal to (Vi−Vsi)/3. Therefore, in this example, VO is about equal to (Vsi−(Vi−Vsi)/3), V2 is about equal to (Vsi+(Vi−Vsi)/3), V3 is about equal to (Vsi+(Vi−Vsi)2/3), and V5 is about equal to (Vi+(Vi−Vsi)/3). At steady state, the partial voltage switching signal Vp1 switches between (Vsi−(Vi−Vsi)/3) and Vsi, partial voltage switching signal Vp2 switches between Vsi and (Vsi+(Vi−Vsi)/3), partial voltage switching signal Vp3 switches between (Vsi+(Vi−Vsi)/3) and (Vsi+(Vi−Vsi)2/3), partial voltage switching signal Vp4 switches between (Vsi+(Vi−Vsi)2/3) and Vi, and partial voltage switching signal Vp5 switches between Vi and (Vi+(Vi−Vsi)/3). If Vp1 is coupled to the electrical filter (205) in FIG. 2(a), the output voltage (Vo) can be a negative voltage.

Figure 5B:
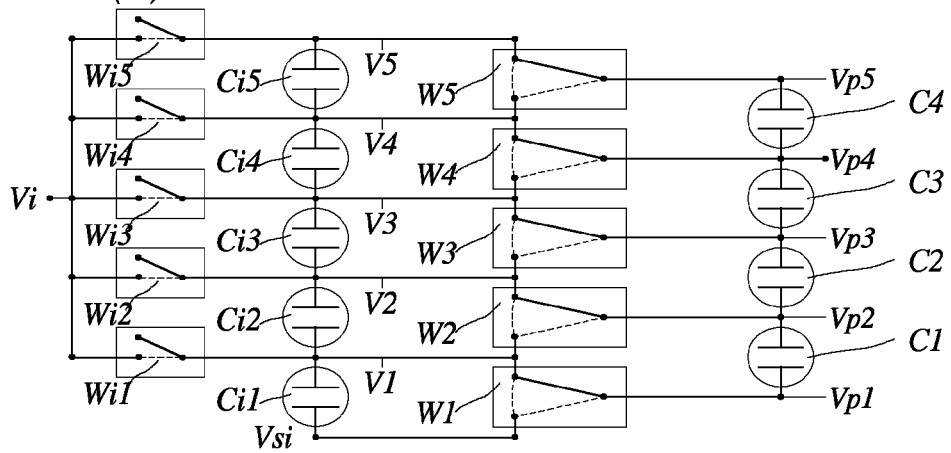

The above examples show that different input connections can change the range of the output voltage. It is therefore often desirable to make the input and/or output connections configurable, as shown by the examples in FIG. 5(b-d). The structures of the partial voltage switching circuit shown in FIG. 5(b) are identical to those shown in FIG. 5(a) except that the connection to input terminal Vi is configurable by electrical switches (Wi1-Wi5). If input switch Wi1 is closed while other input switches (Wi2-Wi5) are open, at steady state, the partial voltage switching signal Vp1 switches between Vsi and Vi, partial voltage switching signal Vp2 switches between Vi and (Vi+(Vi−Vsi)), partial voltage switching signal Vp3 switches between (Vi+(Vi−Vsi)) and (Vi+2(Vi−Vsi)), partial voltage switching signal Vp4 switches between (Vi+2(Vi−

Vsi)) and (Vi+3(Vi−Vsi)), and partial voltage switching signal Vp5 switches between (Vi+3(Vi−Vsi)) and (Vi+4(Vi−Vsi)). If input switch Wi2 is closed while other input switches (Wi1, Wi3-Wi5) are open, at steady state, the partial voltage switching signal Vp1 switches between Vsi and (Vsi+(Vi−Vsi)/2), partial voltage switching signal Vp2 switches between (Vsi+(Vi−Vsi)/2) and Vi, partial voltage switching signal Vp3 switches between Vi and (Vi+(Vi−Vsi)/2), partial voltage switching signal Vp4 switches between (Vi+(Vi−Vsi)/2) and (2Vi−Vsi), and partial voltage switching signal Vp5 switches between (2Vi−Vsi) and (Vi+(Vi−Vsi)3/2). If input switch Wi3 is closed while other input switches (Wi1, Wi2, Wi4, Wi5) are open, at steady state, the partial voltage switching signal Vp1 switches between Vsi and (Vsi+(Vi−Vsi)/3), partial voltage switching signal Vp2 switches between (Vsi+(Vi−Vsi)/3) and (Vsi+(Vi−Vsi)2/3), partial voltage switching signal Vp3 switches between (Vsi+(Vi−Vsi)2/3) and Vi, partial voltage switching signal Vp4 switches between Vi and (Vi+(Vi−Vsi)/3), and partial voltage switching signal Vp5 switches between (Vi+(Vi−Vsi)/3) and (Vi+(Vi−Vsi)2/3). If input switch Wi4 is closed while other input switches (Wi1-Wi3, Wi5) are open, at steady state, the partial voltage switching signal Vp1 switches between Vsi and (Vsi+(Vi−Vsi)/4), partial voltage switching signal Vp2 switches between (Vsi+(Vi−Vsi)/4) and (Vsi+(Vi−Vsi)/2), partial voltage switching signal Vp3 switches between (Vsi+(Vi−Vsi)/2) and (Vsi+(Vi−Vsi)3/4), partial voltage switching signal Vp4 switches between (Vsi+(Vi−Vsi)3/4) and Vi, and partial voltage switching signal Vp5 switches between Vi and (Vi+(Vi−Vsi)/4). If input switch Wi5 is closed while other input switches (Wi1-Wi4) are open, the circuit configuration is the same as that in FIG. 3(a, b). These partial voltage switching signals (Vp1-Vp5) can be connected to the electrical filter (205) in FIG. 2(a), and the output voltage (Vo) can be controlled with excellent flexibility using both the duty cycle control circuit (208) and the configurable input switches (Wi1-Wi5).

Figure 5C:
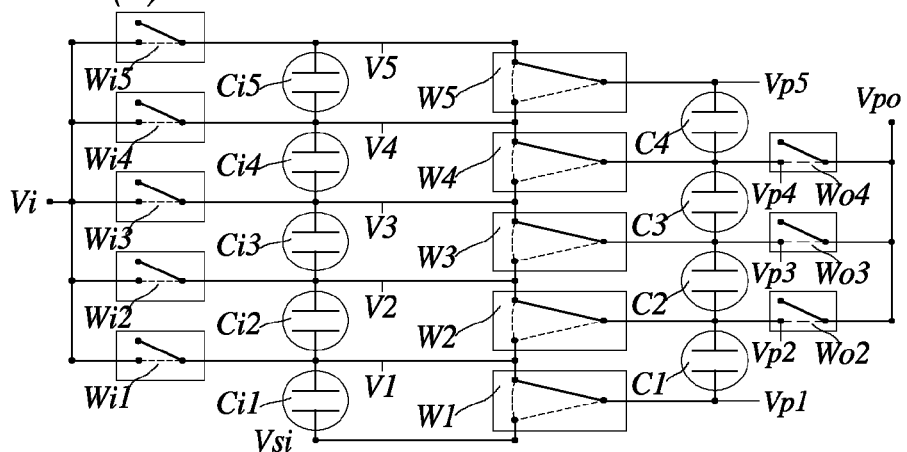
Figure 5D:
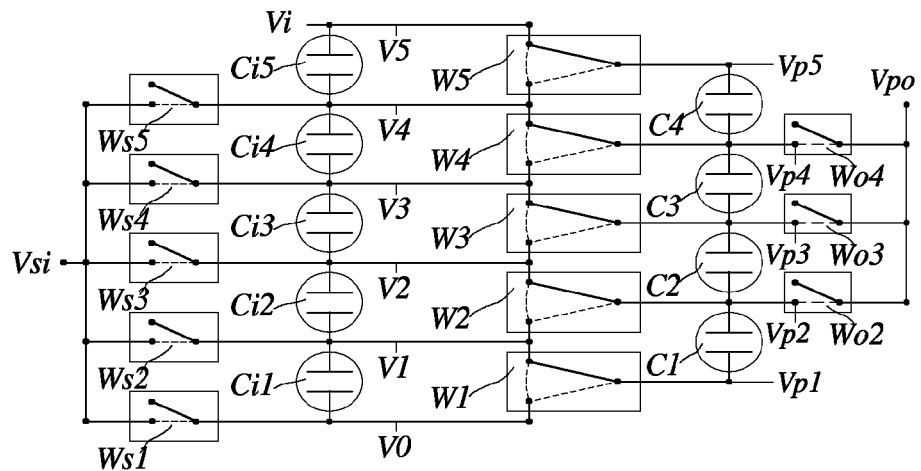

It is often desirable to be able to select different partial voltage switching signals (Vp1-Vp5) at different conditions. FIG. 5(c) shows an example that has the same structures as that in FIG. 5(b) except that the partial voltage switching signal (Vpo) connected to electrical filter can be selectively connected to Vp2, Vp3, or Vp4 by controlling three electrical switches (Wo2-Wo4). FIG. 5(d) shows another example that has the same structures as the partial voltage switching circuit in FIG. 5(c) except that the input stage is using 5 selection switches (Ws1-Ws5) to make Vsi connection configurable. When the input stage and/or the output stage is configurable, the value of the output voltage (Vo) is not only determined by the duty cycle control circuit (208) but also determined by the configurations of input selection switches (Wi1-Wi5, Ws1-Ws5) and output selection switches (Wo2-Wo4), providing excellent flexibility in controlling the ranges of the output voltage. These input/output selection switches are especially useful when the input voltage source (200) is an alternative current (AC) voltage source.

Figure 5E:
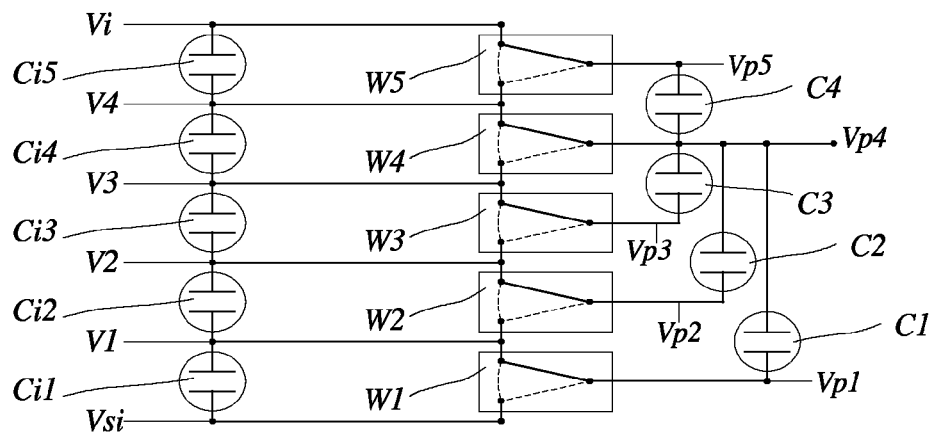
Figure 5F:
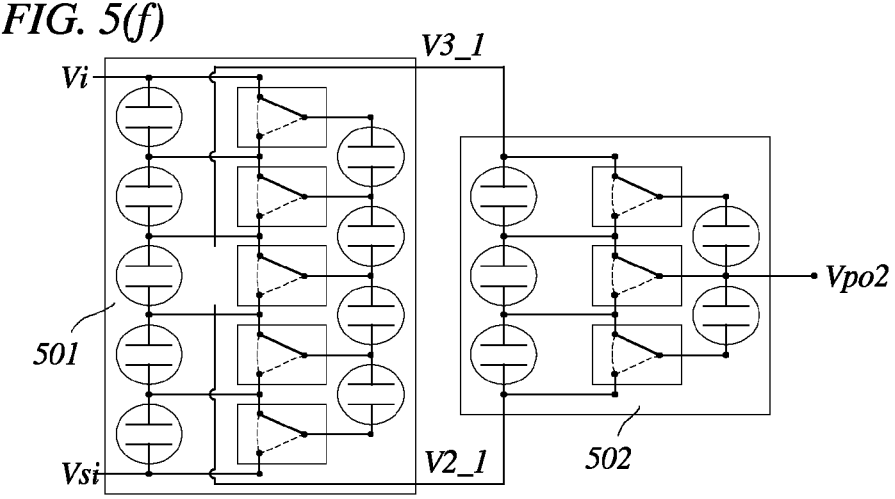

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, we can connect the coupling capacitors (C1-C4) in different ways as shown by the example in FIG. 5(e). The structures of the partial voltage switching circuit shown in FIG. 5(e) are identical to those shown in FIG. 3(a) except that the coupling capacitor C1 couples Vp1 to Vp4 instead of Vp2, coupling capacitor C2 couples Vp2 to Vp4 instead of Vp3. The circuit in FIG. 5(d) has nearly identical functions as the circuit in FIG. 3(a) except the charge sharing effects. For another example, FIG. 5(f) shows an exemplary embodiment of a partial voltage switch circuit that comprises two stages (501, 502) of partial voltage switching circuits. The first stage (501) divides the input voltage (Vi−Vsi) into 5 partial voltages. The second (V2_1) and third (V3_1) voltage connections in the first stage (501) are connected to a second stage (502) partial voltage switching circuit which further divide (V3_1-V2_1) into three partial voltages to generate an partial voltage output (Vpo2) signal that has an amplitude about equals to (Vi−Vsi)/15. Multiple stage partial voltage switching circuits provide further flexibilities in controlling output voltages.

Figure 6A:
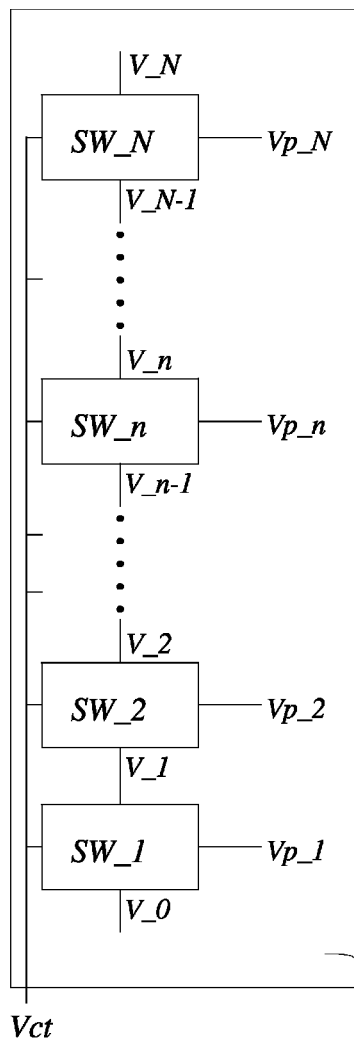
FIG. 6(a) is a simplified symbolic diagrams for a partial voltage switching circuit (611) that comprises N switching circuit blocks.
Figure 6B:
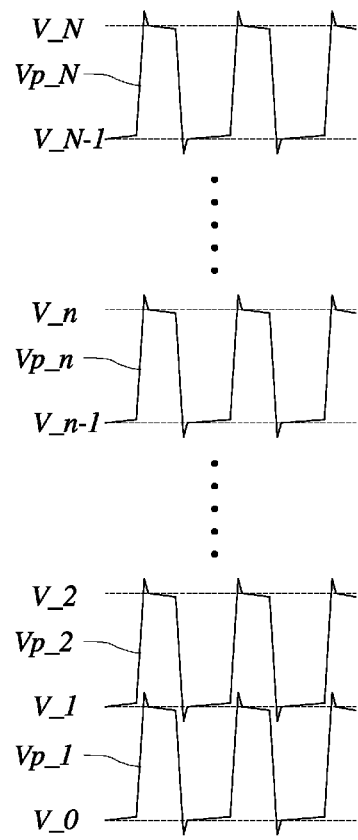
FIG. 6(b) shows typical waveforms for the switching signals (Vp_1, Vp-2, . . . , Vp_n, . . . , Vp_N) provided by the circuit in FIG. 6(a)

FIG. 6(a) shows a partial voltage switching circuit (611) that comprises N switching circuit blocks (SW_1, SW_2, ..., SW_n, ..., SW_N), where N is an integer larger than 2 while n is an integer greater than 1 and smaller than N. Those switching circuit blocks (SW_1, SW_2, ..., SW_n, ..., SW_N) are connected in a relationship as: the first switching circuit block (SW1) outputs a switching signal (Vp_1) that switches mostly between local voltages V_0 and V_1, as illustrated by the voltage waveform in FIG. 6(b); the second switching circuit block (SW_2) outputs a switching signal (Vp_2) that switches mostly between local voltages V_1 and V_2, as illustrated by the voltage waveform in FIG. 6(b); other switching circuit blocks are arranged following similar patterns so that for an integer n that is larger than 1 and smaller than N, the n'th switching circuit block (SW_n) outputs a switching signal (Vp_n) that switches mostly between local voltages V_n−1 and V_n, as illustrated by the voltage waveform in FIG. 6(b); and the N'th switching circuit block (SW_N) outputs a switching signal (Vp_N) that switches mostly between local voltages V_N−1 and V_N, as illustrated by the voltage waveform in FIG. 6(b). A duty cycle control circuit (205) controls the voltage value of the output voltage (Vo) by providing control signals (Vct) to control the duty cycles of the switching signals (Vp_1, Vp_2, ..., Vp_n, ..., Vp_N).

Figure 6C:
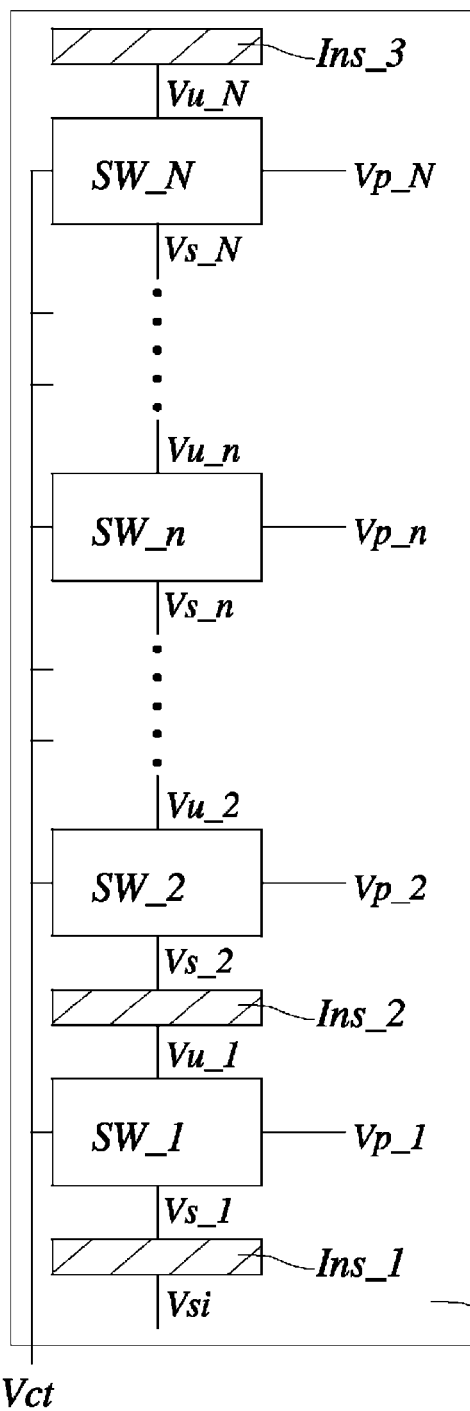
FIG. 6(c) is a simplified symbolic diagrams for exemplary embodiments of a partial voltage switching circuit (631) that comprises N switching circuit blocks plus inserted circuits.
Figure 6D:
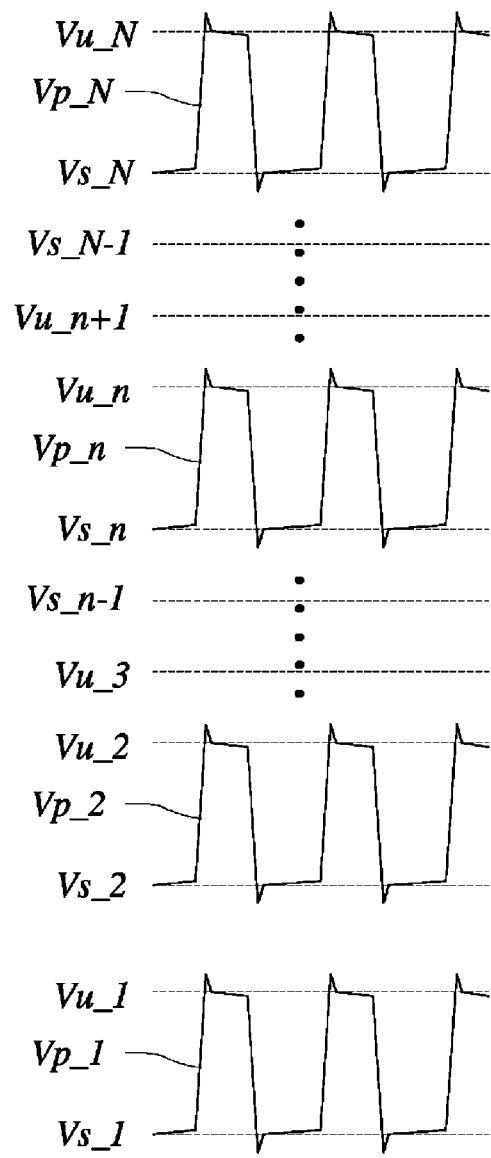
FIG. 6(d) shows typical waveforms for the switching signals (Vp_1, Vp-2, . . . , Vp_n, . . . , Vp_N) provided by the circuit in FIG. 6(c)

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, a partial voltage switching circuit of the present invention may have electrical circuits inserted between switching circuit blocks, as shown by the example in FIG. 6(c). In this example, the partial voltage switching circuit comprises a plurality of switching circuit blocks (SW_1, SW_2, ..., SW_n, ..., SW_N) and possibly other inserted circuits (Ins_1-Ins_3), as shown by FIG. 6(c), where N is an integer larger than 2 and n is an integer greater than 1 and smaller than N. Those switching circuit blocks (SW_1, SW_2, ..., SW_n, ..., SW_N) are connected in a relationship as: the first switching circuit block (SW_1) outputs a switching signal (Vp_1) that switches mostly between its local source voltage (Vu_1) and its local ground voltage (Vs_1), where the voltage value of Vu_1 is between the voltage value of the local source voltage (Vu_2) of the second switching circuit block (SW_2) and the voltage value of Vs_1, as illustrated by the voltage waveform in FIG. 6(d); the second switching circuit block (SW_2) outputs a switching signal (Vp_2) that switches mostly between its local source voltage (Vu_2) and its local ground voltage (Vs_2), where the voltage value of Vu_2 is between the voltage value of the local source voltage (Vu_3) of the third switching circuit block (SW_3) and the voltage value of Vs_2, and the voltage value of Vs_2 is between the voltage value of Vu_2 and the voltage value of the local ground voltage (Vs_1) of the first switching circuit block (SW_1), as illustrated by the voltage waveform in FIG. 6(d); other switching circuit blocks are arranged following similar patterns so that for an integer n that is larger than 1 and smaller than N, the n'th switching circuit block (SW_n) outputs a switching signal (Vp_n) that switches mostly between its local source voltage (Vu_n) and its local ground voltage (Vs_n), where the voltage value of Vu_n is between the voltage value of the local source voltage (Vu_n+1) of the (n+1)'th switching circuit block (SW_n+1) and the voltage value of Vs_n, and the voltage value of Vs_n is between the voltage value of Vu_n and the voltage value of the local ground voltage (Vs_n−1) of the (n−1)'th switching circuit block (SW_n−1), as illustrated by the voltage waveform in FIG. 6(d); and the N'th switching circuit block (SW_N) outputs a switching signal (Vp_N) that switches mostly between its local source voltage (Vu_N) and its local ground voltage (Vs_N), where the voltage value of Vs_N is between the voltage value of Vu_N and the voltage value of the local ground voltage (Vs_N—1) of the (N−1)'th switching circuit block, as illustrated by the voltage waveform in FIG. 6(d). One or more of the switching signals (Vp_1, Vp_2, . . . , Vp_n, . . . , Vp_N) provided by the switching circuit blocks (SW_1, SW_2, . . . , SW_n, . . . , SW_N), that has a voltage amplitude smaller than half of the voltage amplitude of the output voltage, is coupled to an electrical filter in order to provide the electrical power to generate an output voltage (Vo) on the electrical output connection. A duty cycle control circuit (205) controls the voltage value of the output voltage (Vo) by providing control signals (Vct) to control the duty cycles of the switching signals (Vp_1, Vp_2, . . . , Vp_n, . . . , Vp_N). The amplitudes of the partial voltage switching signals (Vp_1, Vp_2, . . . , Vp_n, . . . , Vp_N) are not necessarily equal, as shown by the example in FIG. 5(f). In order to achieve the advantages of partial voltage switching relative to prior art full voltage switching, the number (N) of switching circuit blocks should be larger than 2 while the voltage amplitude of the partial voltage switching signal coupled to the electrical filter should be smaller than half of the voltage amplitude of the output voltage.

The electrical input connection (Vi) is typically coupled to one of the local source voltages (Vu_1, Vu_2_, . . . , Vu_n, . . . , Vu_N) of the switching circuit blocks (SW_1, SW_2, . . . , SW_n, . . . , SW_N) in order to supply electrical power to the electrical circuit. It is often desirable to use electrical switches that controls the electrical connection between the electrical input connection (Vi) and the local source voltage (Vu_1, Vu_2_, . . . , Vu_n, . . . , Vu_N) of the switching circuit blocks (SW_1, SW_2, . . . , SW_n, . . . , SW_N), as illustrated by the examples in FIG. 5(b-d). Electrical switches also can be used to control the electrical connection between the switching signals (Vp_1, Vp_2, . . . , Vp_n, . . . , Vp_N) provided by the switching circuit blocks (SW_1, SW_2, . . . , SW_n, . . . , SW_N) and the electrical filter (205), as illustrated by the examples in FIG. 5(c, d).

Figure 7A:
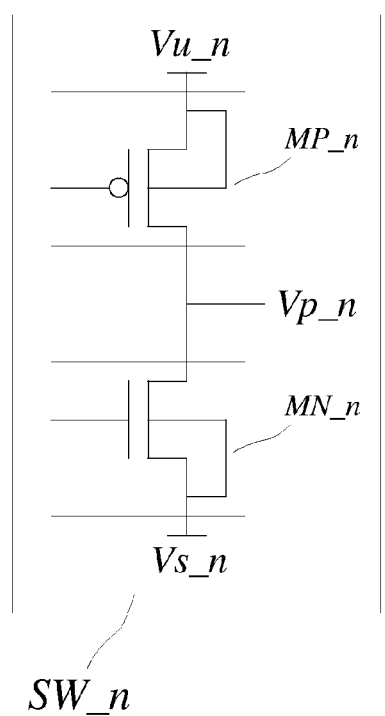
FIG. 7(a) illustrates an exemplary embodiment of the present invention when the switching circuit block (SW_n) in FIG. 6(c) comprises two MOS transistors (MP_n, MN_n)

The switching circuit block (SW_n) can be implemented using MOS transistors, bipolar transistors, electrical diodes, other electrical components, or a combination of different electrical components. FIG. 7(a) is a simplified symbolic diagram for an exemplary embodiment for a switching circuit block (SW_n) in FIG. 6(c). In this example, the switching circuit block (SW_n) comprises two MOS transistors (MP_n, MN_n). The source terminal of MP_n is coupled to the local source voltage (Vu_n), and the source terminal of MN_n is coupled to the local ground voltage (Vs_n), as illustrated in FIG. 7(a). The drain terminal of MP_n is coupled to the drain terminal of MN_n, which is coupled to a partial voltage switching signal (Vp_n), as illustrated in FIG. 7(a). The gate terminals of MP_n and MN_n are controlled by the duty cycle control circuit. The voltage stress on these MOS transistors (MP_n, MN_n) is the voltage difference between its local source voltage (Vu_n) and its local ground voltage (Vs_n), which is typically significantly lower than the voltage stress suffered by the MOS transistors used in prior art full voltage switching circuits. It is therefore possible to use MOS transistors used for logic circuits operating at voltages lower than one third of the maximum voltage amplitude between Vu_N and Vs_1 as the electrical component in partial voltage switching circuit of the present invention. The MOS transistors (MP_n, MN_n) can have gate oxide thicknesses, threshold voltages, channel lengths, source-to-drain breakdown voltages, gate-to-source breakdown voltages, and other parameters that are substantially the same as those parameters of MOS transistors commonly used for logic circuits operating at voltages lower than one third, one tenth, or lower than one tenth, of the maximum voltage amplitude between Vu_N and Vs_1. It is therefore practical to use common integrated circuit (IC) manufacture technologies to build the MOS transistors in the voltage converter circuits of the present invention on the same semiconductor substrate. Low voltage MOS transistors are much smaller in size relative to high voltage transistors. It is therefore practical to build a plurality of the switching circuit blocks (SW_1, SW_2, . . . , SW_n, . . . , SW_N) of the partial voltage switching circuit, or all of the switching circuit blocks, on the same semiconductor substrate. The resulting semiconductor dice are typically small enough so that a plurality of the switching circuit blocks (SW_1, SW_2, . . . , SW_n, . . . , SW_N) of the partial voltage switching circuit can be packaged into the same electrical component.

Figure 7B:
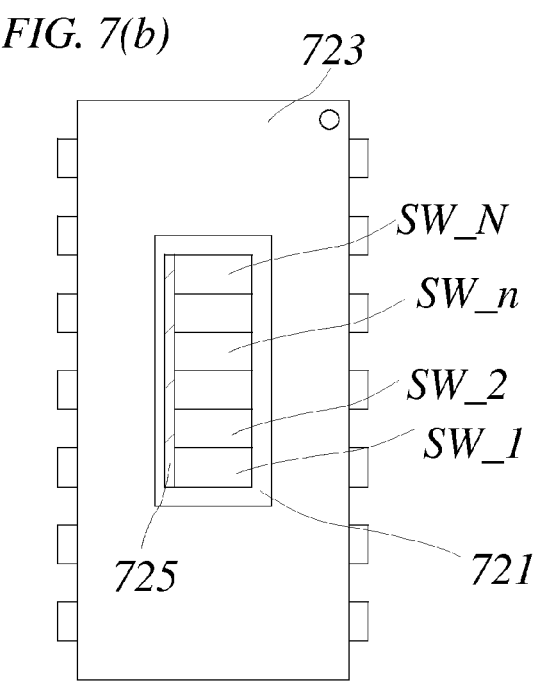
FIG. 7(b) illustrates an exemplary embodiment of the present invention when the partial voltage switching circuit (631) in FIG. 6(c) and a duty cycle control circuit are manufactured on the same semiconductor substrate (721) and packaged in the same electrical component (723).

The duty cycle control circuit typically uses low voltage transistors that are not compatible with high voltage switching transistors used in prior art full voltage switching circuits. Therefore, prior art duty cycle control circuit typically are manufactured separately. For partial voltage switching circuits, it is practical to build a plurality of the switching circuit blocks (SW_1, SW_2, . . . , SW_n, . . . , SW_N) of the partial voltage switching circuit on the same semiconductor substrate and/or placed in the same electrical component with the duty cycle control circuit. FIG. 7(b) shows an embodiment when all the switching circuit blocks (SW_1, SW_2, . . . , SW_n, . . . , SW_N) of the partial voltage switching circuit, and a duty cycle control circuit (725) are manufacture on the same semiconductor substrate (721) and packaged into the same electrical component (723). Placing the duty cycle control circuit nearby the switching circuit blocks can significantly improve speed and switching efficiency. The switching frequencies of the output signals (Vp_1, Vp_2, . . . , Vp_n, . . . , VP_N) of the switching circuit blocks (SW_1, SW_2, . . . , SW_n, . . . , SW_N) of the electrical circuit can be higher than one million cycles per second, ten million cycles per second, one hundred million cycles per second, or higher.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. An electrical voltage converter circuit comprising:
An electrical input connection,
An electrical filter that comprises at least one electromagnetic component, where said electromagnetic component is either a transformer or an inductor,
An electrical output connection that is connected to the output of the electrical filter,
A duty cycle control circuit, and
A partial voltage switching circuit that comprises a plurality of switching circuit blocks (SW_1, SW_2, . . . , SW_n, . . . , SW_N), where N is an integer larger than 2 and n is an integer greater than 1 and smaller than N, and said switching circuit blocks (SW1, SW_2, . . . , SW_n, . . . , SW_N) are arranged in a relationship as:
the first switching circuit block (SW1) outputs a switching signal (Vp_1) that switches mostly between its local source voltage (Vu_1) and its local ground voltage (Vs_1), where the voltage value of Vu_1 is between the voltage value of the local source voltage (Vu_2) of the second switching circuit block (SW_2) and the voltage value of Vs_1;
the second switching circuit block (SW_2) outputs a switching signal (Vp_2) that switches mostly between its local source voltage (Vu_2) and its local ground voltage (Vs_2), where the voltage value of Vu_2 is between the voltage value of the local source voltage (Vu_3) of the third switching circuit block (SW_3) and the voltage value of Vs_2, and the voltage value of Vs_2 is between the voltage value of Vu_2 and the voltage value of the local ground voltage (Vs_1) of the first switching circuit block (SW_1);
other switching circuit blocks are arranged following similar patterns so that for an integer n that is larger than 1 and smaller than N, the n'th switching circuit block (SW_n) outputs a switching signal (Vp_n) that switches mostly between its local source voltage (Vu_n) and its local ground voltage (Vs_n), where the voltage value of Vu_n is between the voltage value of the local source voltage (Vu_n+1) of the (n+1)'th switching circuit block (SW_n+1) and the voltage value of Vs_n, and the voltage value of Vs_n is between the voltage value of Vu_n and the voltage value of the local ground voltage (Vs_n−1) of the (n−1)'th switching circuit block (SW_n−1); and
the N'th switching circuit block (SW_N) outputs a switching signal (Vp_N) that switches mostly between its local source voltage (Vu_N) and its local ground voltage (Vs_N), where the voltage value of Vs_N is between the voltage value of Vu_N and the voltage value of the local ground voltage (Vs_N−1) of the (N−1)'th switching circuit block;
where one of the switching signals (Vp_1, Vp_2, . . . , Vp_n, . . . , Vp_N) provided by the switching circuit blocks (SW_1, SW_2, . . . , SW_n, . . . , SW_N), that has a voltage amplitude smaller than half of the voltage amplitude of the output voltage, is coupled to the electrical filter in order to provide the electrical power to generate an output voltage (Vo) on the electrical output connection, and that the duty cycle control circuit controls the voltage value of the output voltage (Vo) by controlling the duty cycles of the switching signals (Vp_1, Vp_2, . . . , Vp_n, . . . , Vp_N).

2. The electrical input connection of the electrical voltage converter circuit in claim 1 is coupled to one of the local source voltage (Vu_1, Vu_2_, . . . , Vu_n, . . . , Vu_N) of the switching circuit blocks (SW_1, SW_2, . . . , SW_n, . . . , SW_N).

3. The electrical voltage converter circuit in claim 1 comprises a plurality of electrical switches that controls the electrical connection between the electrical input connection and the local source voltage (Vu_1, Vu_2_, . . . , Vu_n, . . . , Vu_N) of the switching circuit blocks (SW_1, SW_2, . . . , SW_n, . . . , SW_N).

4. The electrical voltage converter circuit in claim 1 comprises a plurality of electrical switches that controls the electrical connection between the partial voltage switching signals (Vp_1, Vp_2, . . . , Vp_n, . . . , Vp_N) provided by the switching circuit blocks (SW_1, SW_2, . . . , SW_n, . . . , SW_N) and the electrical filter.

5. The electrical components used in the switching circuit blocks (SW_1, SW_2, . . . , SW_n, . . . , SW_N) of the electrical voltage converter circuit in claim 1 comprise MOS transistors operating at voltages lower than one third of the maximum voltage amplitude between Vu_N and Vs_1.

6. The MOS transistors in claim 5 have gate oxide thicknesses that are substantially the same as the gate oxide thicknesses of MOS transistors commonly used for logic circuits operating at voltages lower than one third of the maximum voltage amplitude between Vu_N and Vs_1.

7. The MOS transistors in claim 5 have threshold voltages that are substantially the same as the threshold voltages of MOS transistors commonly used for logic circuits operating at voltages lower than one third of the maximum voltage amplitude between Vu_N and Vs_1.

8. The MOS transistors in claim 5 have channel lengths that are substantially the same as the channel lengths of MOS transistors commonly used for logic circuits operating at voltages lower than one third of the maximum voltage amplitude between Vu_N and Vs_1.

9. The MOS transistors in claim 5 have source-to-drain breakdown voltages that are substantially the same as the source-to-drain breakdown voltages of MOS transistors commonly used for logic circuits operating at voltages lower than one third of the maximum voltage amplitude between Vu_N and Vs_1.

10. The MOS transistors in claim 5 have gate-to-source breakdown voltages that are substantially the same as the gate-to-source breakdown voltages of MOS transistors commonly used for logic circuits operating at voltages lower than one third of the maximum voltage amplitude between Vu_N and Vs_1.

11. The MOS transistors in claim 5 are manufactured on the same semiconductor substrate.

12. A plurality of the switching circuit blocks (SW_1, SW_2, . . . , SW_n, . . . , SW_N) of the partial voltage switching circuit of the electrical voltage converter circuit in claim 1 are manufactured on the same semiconductor substrate.

13. A plurality of the switching circuit blocks (SW_1, SW_2, . . . , SW_n, . . . , SW_N) of the partial voltage switching circuit of the electrical voltage converter circuit in claim 1 are packaged into the same electrical component.

14. The duty cycle control circuit and a plurality of the switching circuit blocks (SW_1, SW_2, . . . , SW_n, . . . , SW_N) of the partial voltage switching circuit of the electrical voltage converter circuit in claim 1 are manufactured on the same semiconductor substrate.

15. The duty cycle control circuit and a plurality of the switching circuit blocks (SW_1, SW_2, . . . , SW_n, . . . , SW_N) of the partial voltage switching circuit of the electrical voltage converter circuit in claim 1 are packaged into the same electrical component.

16. The electrical components used in the switching circuit blocks (SW_1, SW_2, . . . SW_n, . . . , SW_N) of the electrical voltage converter circuit in claim 1 comprise MOS transistors commonly used for logic circuits operating at voltages lower than one tenth of the maximum voltage amplitude between Vu_N and Vs_1.

17. The MOS transistors in claim 16 have gate oxide thicknesses that are substantially the same as the gate oxide thicknesses of MOS transistors commonly used for logic circuits operating at voltages lower than one tenth of the maximum voltage amplitude between Vu_N and Vs_1.

18. The switching frequencies of the output signals (Vp_1, Vp_2, . . . , Vp_n, . . . , Vp_N) of the switching circuit blocks (SW_1, SW_2, . . . , SW_n, . . . , SW_N) of the electrical voltage converter circuit in claim 1 are higher than one million cycles per second.

19. The switching frequencies of the output signals (Vp_1, Vp_2, . . . , Vp_n, . . . , VP_N) of the switching circuit blocks (SW_1, SW_2, . . . , SW_n, . . . , SW_N) of the electrical voltage converter circuit in claim 1 are higher than ten million cycles per second.

20. The switching frequencies of the output signals (Vp_1, Vp_2, . . . , Vp_n, . . . , VP_N) of the switching circuit blocks (SW_1, SW_2, . . . , SW_n, . . . , SW_N) of the electrical voltage converter circuit in claim 1 are higher than one hundred million cycles per second.

\* \* \* \* \*